United States Patent [19]
Faull

[11] Patent Number: 5,245,976
[45] Date of Patent: * Sep. 21, 1993

[54] AIR INDUCTION CONTROL DEVICE

[75] Inventor: Simón H. Faull, Caracas, Venezuela

[73] Assignee: Mike Baitel, Caracas, Venezuela

[*] Notice: The portion of the term of this patent subsequent to May 19, 2009 has been disclaimed.

[21] Appl. No.: 884,182

[22] Filed: May 18, 1992

Related U.S. Application Data

[63] Continuation of Ser. No. 720,292, Jun. 25, 1991, Pat. No. 5,113,837.

[30] Foreign Application Priority Data

Jun. 25, 1990 [VE] Venezuela .................. FP-01 28087

[51] Int. Cl.$^5$ .................................................. F02M 23/00
[52] U.S. Cl. .......................................... 123/587; 123/585; 137/536; 137/540; 251/118
[58] Field of Search ............... 123/585, 587; 251/118; 137/536, 540

[56] References Cited
U.S. PATENT DOCUMENTS

| | | | |
|---|---|---|---|
| 3,043,286 | 7/1962 | Blomberg | 123/585 |
| 3,176,706 | 4/1965 | Scramlin | 123/586 |
| 3,287,899 | 11/1966 | Bintz | 123/587 |
| 3,943,899 | 3/1976 | Matsuoka et al. | 123/585 |
| 3,948,236 | 4/1976 | Nartowski et al. | 123/585 |
| 4,124,005 | 11/1978 | Assenheimer et al. | 123/585 |
| 4,237,842 | 12/1980 | Fukuhara et al. | 123/327 |
| 4,303,047 | 12/1981 | Dorsic | 123/327 |
| 4,434,778 | 3/1984 | Morita et al. | 123/587 |
| 4,669,702 | 6/1987 | Tripp | 251/118 |
| 4,828,219 | 5/1989 | Ohmi et al. | 251/118 |
| 4,852,539 | 8/1989 | Pankow | 123/587 |
| 4,938,199 | 7/1990 | Sato et al. | 123/585 |
| 5,012,789 | 5/1991 | Spicuzza et al. | 123/587 |
| 5,113,837 | 5/1992 | Faull | 123/585 |

Primary Examiner—Noah P. Kamen
Attorney, Agent, or Firm—Willian Brinks Olds Hofer Gilson & Lione

[57] ABSTRACT

An air induction control device for an internal combustion engine comprises means defining a communication passageway for communicating between air at atmospheric pressure and the air in the downstream passageway from a throttle valve. A valve member is disposed in the communication passageway and is moveable toward the downstream direction thereof to open the communication passageway in response to an atmospheric pressure greater than pressure in the downstream passageway. A valve biasing means is disposed to apply force to and bias the valve member in the upstream direction to close the communication passageway in response to the pressure differential between atmospheric pressure and the air pressure int he downstream passageway. A flow restriction element positioned downstream of the valve member comprises calibrated openings defining a primary chamber and secondary chamber, wherein the volumetric proportion of the primary chamber: second chamber: calibrated openings is about 50-70: 25-35: 0.8-1.2.

14 Claims, 6 Drawing Sheets

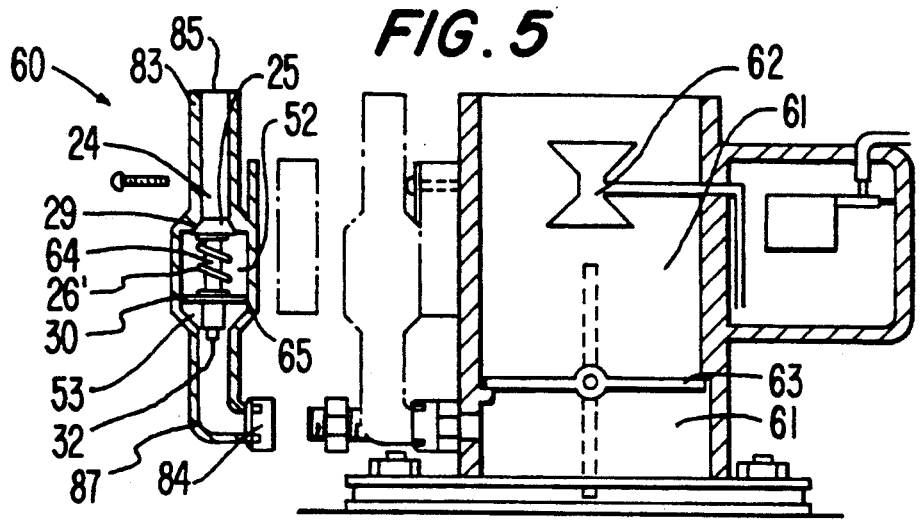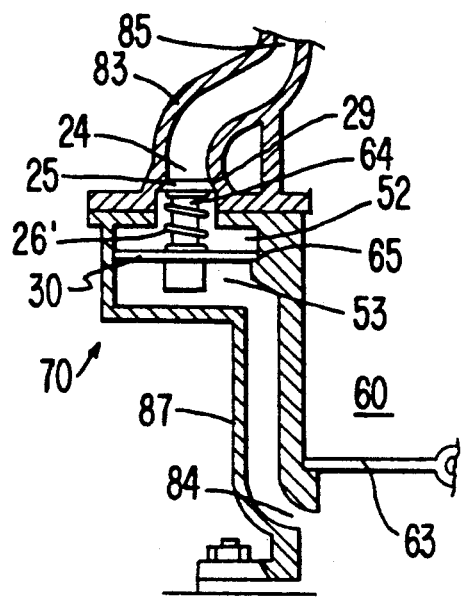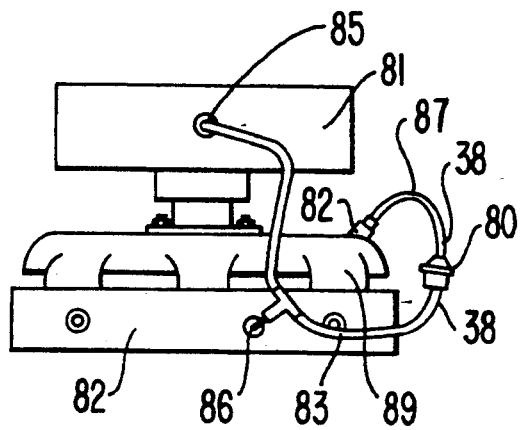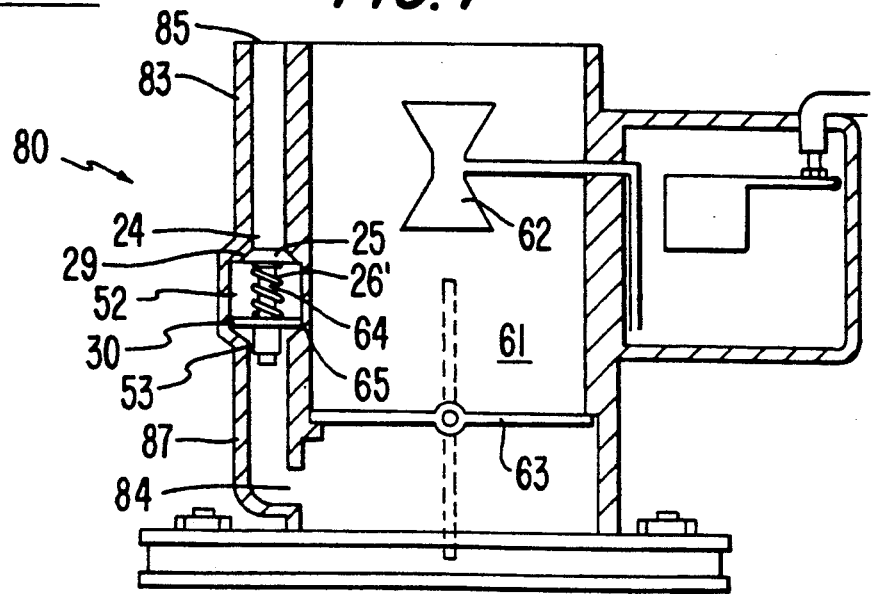

AIR INDUCTION CONTROL DEVICE

This is a continuation of application Ser. No. 07/720,292, filed Jun. 25, 1991, now U.S. Pat. No. 5,113,837.

BACKGROUND OF THE INVENTION

1. Field of the Invention

This invention elates, in general, to an improvement to an air induction control device for an internal combustion engine, and more particularly to an air induction control device which modifies the air/fuel mixture in the combustion chamber by controlling the intake vacuum int he engine intake passageway within a desirable range.

2. Description of the Prior Art

During deceleration of an Internal Combustion ("IC") engine the throttle valve in the intake passageway is fully closed despite high engine speed, and accordingly, the intake vacuum downstream of the throttle valve is excessively increased. As a result, several undesirable results may occur. By way of example, engine oil sucked into the combustion chambers of the engine by the action of the increased intake vacuum can cause an increase in the amount of oil burning. Additionally, the fuel lining the intake passage is vaporized, temporarily rendering the fuel/air ratio in the combustion chamber overly rich which can result in stalling and other engine malfunction.

An illustration of another problem associated with deceleration or periods of idle, when the vacuum in the engine is at its maximum, is that the standard carburetors used in internal combustion engines have a venturi whereby the high speed of air drawn into the engine suctions up fuel. When the vacuum in the intake manifold becomes great, the amount of fuel consumed increases, thus decreasing the efficiency of the engine.

Since the earliest internal combustion engines, there has been a search for a method to provide the intake manifold with an optimal mixture of air to fuel, in order to ensure maximum efficiency.

Air induction control valves have heretofore generally been restricted to those intended to prevent extreme vacuum conditions from developing in the combustion chamber during periods of deceleration. Fukuhara, U.S. Pat. No. 4,237,842, discloses such a spring valve that is in communication with the air upstream from the throttle and the air passage downstream through two external tubes. When the intake vacuum exceeds a predetermined level in the downstream valve tube, a valve member is moved against the force of the coil spring toward the stopper and accordingly separates from the valve seat allowing air to enter. Conversely, the valve closes when the intake vacuum in the downstream tube rises above the predetermined level to allow the biasing force of the spring to push the valve member back against the valve seat so as to block communication between the upstream and downstream sides of the valve.

Dorsic, U.S. Pat. No. 4,303,047, shows a method for controlling the vacuum in an engine through a bypass that contains a valve that responds to the differential in pressure between the downstream side of a butterfly valve and the atmosphere. This butterfly valve is downstream of and mechanically connected in a normal position to the carburetor throttle valve.

Morita, U.S. Pat. No. 4,434,778, discloses a valve set in an air passage communicating with the upstream and downstream sides of a throttle valve. When the valve is open the air passes through the valve from the air filter to the air passageway downstream of the throttle valve. A spring in the valve is activated by a diaphragm member which positions the valve body in an open or closed position. The diaphragm consists of two chambers, one of which is in direct communication with the downstream air passage and directly affected by the engine vacuum level, the other of which is in communication with the first chamber through a bellows to which the spring and valve stem are attached.

In early aeronautical IC engines, optional air/fuel mixture was achieved through a manual control of the mixture in which the amount of air is controlled and the variations are made by observation of the temperature variations in the cylinders through the use of appropriate instruments: the temperature indicator in the cylinder heads or an EGT and EET.

In later IC engines, a servo mechanism was added that operated on the basis of engine temperature variations. The servo would close the air intake to the engine to a greater or less degree in order to achieve stability through the incorporation of controlled cooling fins. In this way the temperature would by stabilized, and a consistent air intake flow can be maintained.

The devices described above provide some advantages in operation, namely, preventing excessive vacuum formation during deceleration. Nevertheless, none of these devices uses a flow restriction element that comprises calibrated openings to effect an increase in fuel efficiency under all operating conditions.

Additionally, none of these devices attempts to polarize oxygen molecules entering the induction control valve to effect more efficient molecular bonding of fuel an air, thus resulting in maximal fuel efficiency in an internal combustion engine.

SUMMARY OF THE INVENTION

According to this invention, an air induction control device is provided for an internal combustion engine, where the engine has an intake passageway, and a throttle valve positioned in the intake passageway. The air induction control device of this invention comprises a means of communication between the air at atmospheric pressure and the air in the downstream passageway from the throttle valve. A valve member is disposed in the communication passageway and is moveable toward the downstream direction, thereby opening the communication passageway in response to a pressure differential reflecting atmospheric pressure greater than the air pressure in the downstream passageway. Means to bias the valve is positioned to apply force to and bias the valve member in the upstream direction, thus closing the communication passageway. The biasing means responds to pressure differential between air at atmospheric pressure and air in the downstream passageway in such a way that the degree of clearance of the valve member from a valve seat varies depending on the pressure differential between the air at atmospheric pressure and the air in the downstream passageway. The valve seat is located upstream from the valve member and is situated so that the valve member rests against the valve seat when the communication passageway is closed. A flow restriction element is positioned downstream from the valve member and comprises a plurality of calibrated openings. The flow restriction element divides the device into a primary chamber and a secondary chamber. The volumetric proportion of the primary chamber: secondary chamber: calibrated openings is within the range 50-70: 25-35: 0.8-1.2.

Preferably, the spring is calibrated to a predetermined resistance and the flow restriction element comprises a plate having calibrated openings symmetrically positioned around the flow restriction element perimeter.

It is another object of the ivention to provide an air induction control device that acts to maximize fuel efficiency through polarizing air molecules passing through the device in order to optimize molecular boding of air and fuel prior to and during combustion.

In accordance with the invention, a method of air induction control is provided for an internal combustion engine including an air/fuel intake passageway having a throttle valve. This method comprises providing a communication passageway for communicating between air at atmospheric pressure and air in a downstream passageway from the throttle valve. A valve member is positioned int he communication passageway, which valve member moves toward the downstream direction thereof to open the communication passageway in response to pressure differential reflecting atmospheric pressure greater than pressure in the downstream passageway. Next, the valve member is biased to apply force and to bias the valve member in the upstream direction closing the communication passageway. The biasing means responds to the pressure differential between atmospheric pressure and the air pressure int he downstream passageway. The degree of clearance of the valve member from a valve seat disposed in the communication passageway upstream from the valve member varies depending on the pressure differential between the air in the downstream passageway and atmospheric pressure. Finally, a flow restriction element positioned downstream of the valve member comprising calibrated openings is provided which acts to optimize the air/fuel ration thereby maximizing engine fuel efficiency.

It is another object of this invention to provide for a method of controlling air induction in order to maximize fuel efficiency through polarizing air molecules that passage through the device in order to optimize molecular bonding of air and fuel.

As pointed out in greater detail below, the air induction control device and method of inducting air of this invention provides important advantages. The air induction control device performs under all operating conditions and acts to maximize fuel efficiency in all internal combustion engines, both of the standard carburetor type and the fuel injection type.

The invention itself, together with further objects and attendant advantages, will best be understood by reference to the following description, taken in conjunction with the accompanying drawings.

BRIEF DESCRIPTION OF THE DRAWINGS

FIG. 5 shows an alternative embodiment of an air induction device in accordance with the present invention where the air induction device is attached to the side of the carburetor.

FIG. 6 represents yet another alternative embodiment of the air induction control device in accordance with the present invention.

FIG. 7 represents a carburetor with a built in air induction device in accordance with this invention.

FIG. 8 represents an internal combustion engine wherein a tube connects the intake manifold to the air filter, and an air induction device in accordance with the present invention is positioned along the tube.

DETAILED DESCRIPTION

Figure 1:
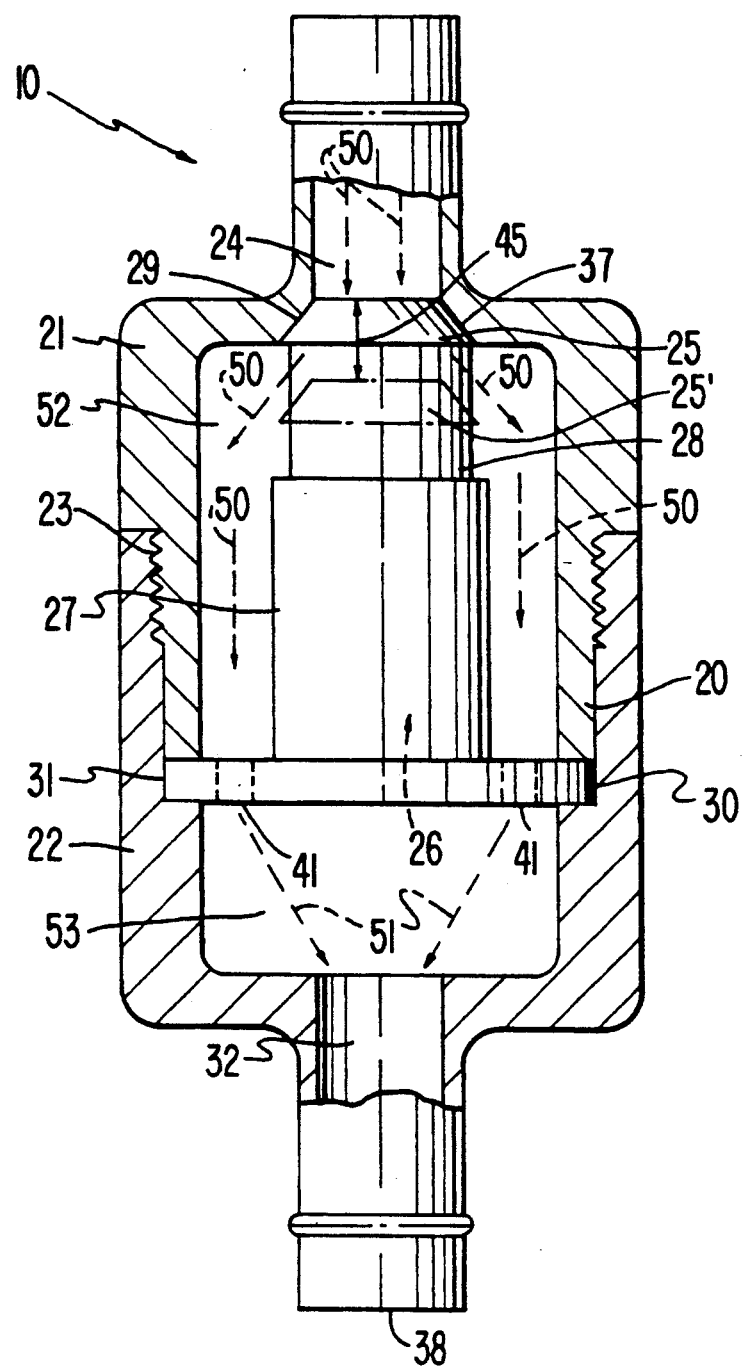
FIG. 1 represents a vertical cross sectional view of the preferred embodiment of an air induction device in accordance with the present invention.
Figure 2:
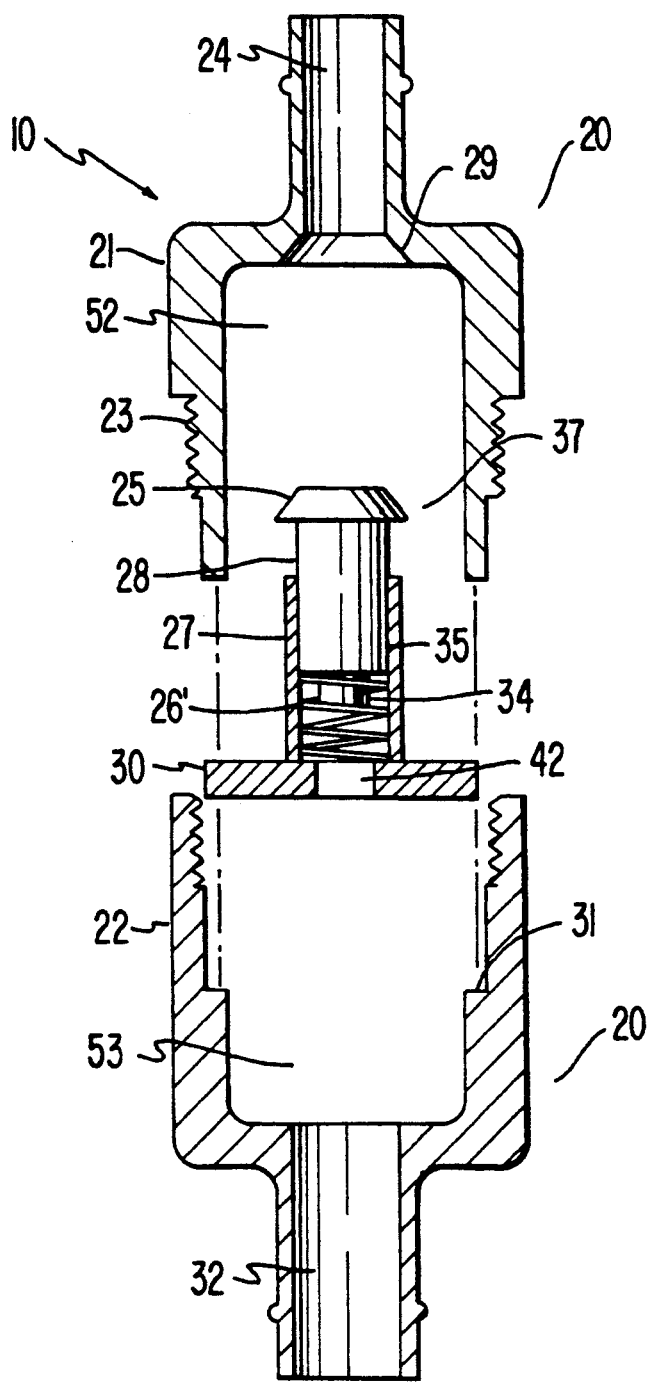
FIG. 2 represents an exploded view, cross section, of the present invention,.

Turning now to the drawings, FIG. 1 represents an assembled air induction device 10 in accordance with the preferred embodiment of this invention and FIG. 2 represents a disassembled air induction control device 10. As shown in FIG. 1, valve casing 20 is separable into two halves or sections, an upper section 21 mating with a lower section 22 at a threaded joint 23. A hose or tube 83 (shown in FIG. 8), connects the upper section 21 of the air induction device 10 at a valve inlet 24, which is about 9.5 mm in diameter, to a point upstream 85 (shown in FIGS. 5-8) of a carburetor throttle valve 63 (shown in FIGS. 5 and 7) at which there is air at atmospheric pressure. The communication passageway 38 is closed when a valve member head 25 rests against a valve seat 29 due to the biasing force exerted by a valve biasing means 26, positioned in a spring guide 27 which exerts force against a valve member 28.

The resistance in the biasing means, which pushes the valve member head 25 toward the valve seat 29 and closes it under conditions of equal pressure, is calculated on the basis of the maximum pressure int he intake manifold of standard internal combustion engines used in automobiles and the atmospheric pressure of 1,033.5 grs/cm$_2$ at sea level and 516.75 grs/cm$_2$ at 19,000.00 feet (5757.00 mts) above sea level. This calculation indicates that the preferred resistance is about 257.5 grs/cm.

Turning to FIG. 2, the valve member 28 is situated in a piston like fashion in the spring guide 27 on top of a calibrated spring 26', which spring functions as the valve biasing means. The calibrated spring 26' rests on a flow restriction element 30. The valve member 28 is a compound cylinder, with a smaller diameter cylinder 34 at the bottom of the valve member 28, which smaller cylinder receives the calibrated spring 26', and a larger diameter cylinder 35 that fits into the spring guide 27. The valve member head 25 is shaped in truncated cone with an edge 37 situated at about a 45° angle to fit flush into the valve seat 29.

The spring guide 27 extends normally from the flow restriction element 30. A ledge 31 is indented into the lower section 22 of the valve casing 20 and supports the flow restriction element 30. The flow restriction element 30 separates the valve into a primary chamber 52 and a secondary chamber 53. In this embodiment, the primary chamber 52 has cylindrical dimensions of about 28 mm in height and about 26 mm in diameter and the secondary chamber 53 has dimensions of about 12 mm in height and about 26 mm in diameter. The lower section 22 comprises a valve outlet 32 which connects the induction control device 10 to a point 84 (shown in FIG. 5-7) on the downstream passageway of the engine intake passageway, e.g., that part of the engine intake passageway downstream from the throttle valve 63. The valve outlet 32 is connected tot he point 84 on the downstream passageway by a hose or tube 87 (shown in FIGS. 5-7). The valve outlet has a diameter of about 9.5 mm.

Figure 3:
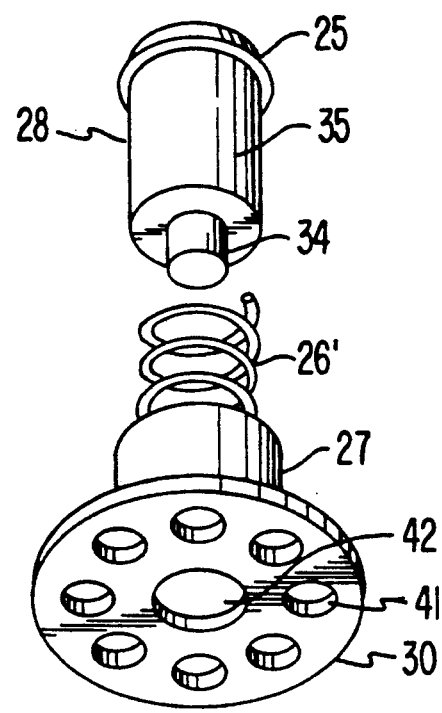
FIG. 3 represents an exploded view of the valve member and flow restriction element showing the calibrated holes in accordance with the preferred embodiment of this invention.

FIG. 3 depicts a perspective view of the valve member 28, the calibrated spring 26', the sprig guide 27, and the flow restriction element 30. Openings 41 are spaced symmetrically around the perimeter f the flow restriction element 30. An additional opening 42 is present in the center of the flow restriction element 30 directly below the spring guide 27 and calibrated spring 26'. By way of example, the element 30 in this embodiment is about 30 mm in diameter with openings 41 of about 2.00 to 3.00 mm in height and about 3.36 mm diameter. The opening 42 in the center of the flow restriction element 30 is about 8.0 mm in diameter. The spring guide 27 has an outside diameter of about 13.0 mm and an inside diameter of about 11.0 mm, and a height of about 20 mm above the flow restriction element. The valve member 28 has a diameter of about 11.0 mm so as to allow the valve member 30 to fit flush into the spring guide 27.

Figure 4:
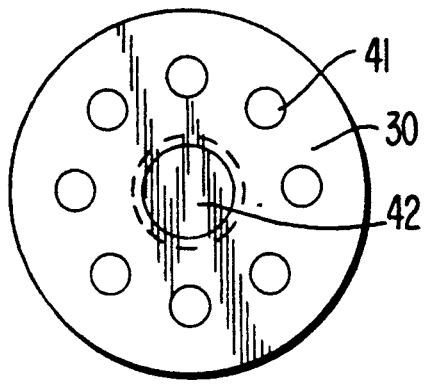
FIG. 4 represents a bottom view of the flow restriction element of FIG. 3.

FIG. 4 represents an end view of one embodiment of the flow restriction element 30 with eight symmetrically spaced openings 41 positioned around the perimeter of the flow restriction element 30, and the center opening 42.

Returning to FIG. 1, the upper section 21 and lower section 22 of the valve casing 20 are connected at the threaded joint 23. When the vacuum in the combustion chamber of the engine reaches a specified level it is reflected int he secondary chamber 53. The valve member head 25 is then biased away from the valve seat 29 to a compressed position 25'.

The calibrated spring 26' contained in the spring guide 27 has a tension that is designed to allow a communication passageway 38 to open upon the engine vacuum reaching a specified level. The communication passageway 38 connects the point 84 on the downstream passageway (shown on FIGS. 5-7) with a point upstream at atmospheric pressure 85 (also shown on FIGS. 5-7). The clearance 45 of the biased valve member head 25' to the valve seat 29 is determined by the pressure differential between the atmospheric pressure and pressure int he intake manifold of the engine. Of course, the pressure in the intake manifold of the engine is directly reflected in the secondary chamber 51 of the air induction control device 10.

When the valve member head 25 is compressed (as reflected by numeral 25'), air flow 50 enters the primary chamber 52 where it is homogenized at a constant pressure. Air flow 50 proceeds through the induction control device 10 until the air flow 50 encounters the flow restriction element 30. The flow restriction element 30 comprises eight symmetrical circular openings 41 equally spaced around the perimeter. The air flow 50 passes the flow restriction element 30, where the air flow becomes polarized 51, enters the secondary chamber 53, and continues past the valve outlet 32, through tube 87 past the point downstream 84 where the air flow reenters the engine intake passageway 61 (shown in FIGS. 5-7) and toward the intake manifold of the engine. (See, for example, FIGS. 5, 6 an 7)

By the action of air flowing through the calibrated openings 41 in the flow restriction element 30, the air flow 50 becomes polarized in a way to optimize the air/fuel mixture thereby maximizing the fuel efficiency of the engine. In this manner, the oxygen molecules are given sufficient electrical excitation to optimize their attraction to the hydrogen contained in the carbon rings of hydrocarbon fuel such as gasoline or the like. In the preferred embodiment, the volumes of the primary chamber 52: secondary chamber 53: combined calibrated openings 41 is in proportion of about 60:30:1.

Variations of the embodiments described above are possible so long as the volumetric proportions of the primary chamber, secondary chamber and calibrated openings remain within the correct proportions, and of course the relative diameters of the inlet and outlet valves are maintained.

For example, in the alternative embodiment of FIG. 5, an air induction control device 60 is mounted to the side of an engine intake passageway 61. Inside the engine intake passageway 61 is the carburetor 62 and the throttle valve 63. The valve intake 24 of the induction control device 60 connects directly to the atmosphere 85 via a tube 83. The valve member head 25 is shown pressed against the valve seat 29 by the spring 26'. The calibrated spring 26' is wrapped around the spring guide 64. Under this variation the spring guide 64 also functions as the valve member 28. The flow restriction element 30 rests on a ledge 65 in the induction control device 60. The air induction outlet 32 is connected to the downstream passageway at point 84 via a tube 87.

Another variation of the present invention is depicted in FIG. 6. In this variation, the air induction control device 70 functions in much the same way as the air induction control device 60 in FIG. 5.

In another variation depicted in FIG. 7, a carburetor 62 with the engine intake passageway 61 and throttle valve 63 is manufactured with the air induction control device 80 as an integral part thereof, functioning in much the same way as the air induction control device of FIG. 5.

In yet another variation depicted in FIG. 8, the air induction control device 90 is connected to flexible hose 83, 87. The valve inlet 24 is connected tot he hose 83 that leads to the air cleaner housing 81 at 85 and the engine valve cover 82 at 86. The lower section outlet 32 is connected by hose to the intake manifold 82' through hose section 87.

Figure 9:
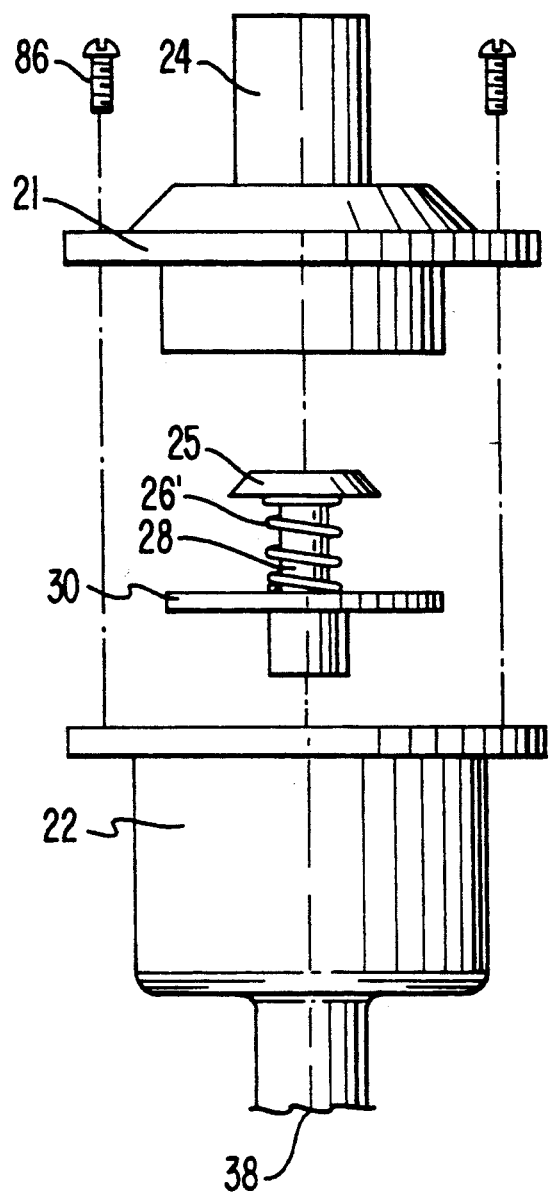
FIG. 9 represents an exploded view of an alternative embodiment of an air induction device.
Figure 10:
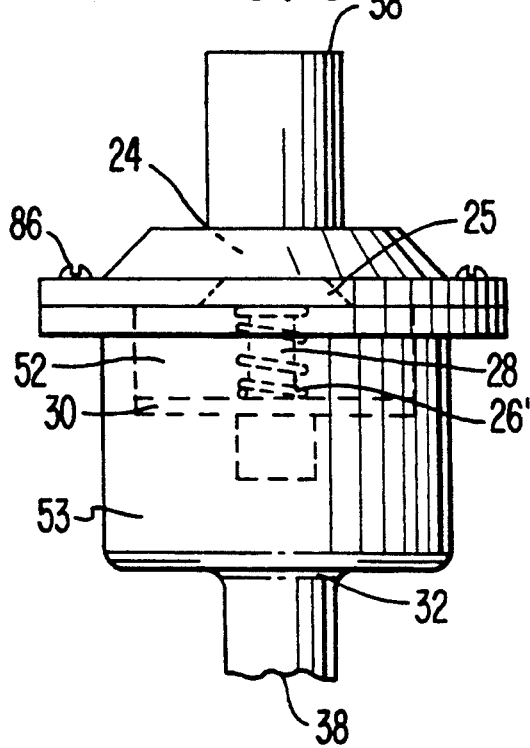
FIG. 10 represents the device in FIG. 9 in assembled form.

In yet another variation depicted in FIGS. 9 and 10, the upper section 21 of the valve casing 20 is connected to the lower section 22 by a set of screws 86.

Figure 11:
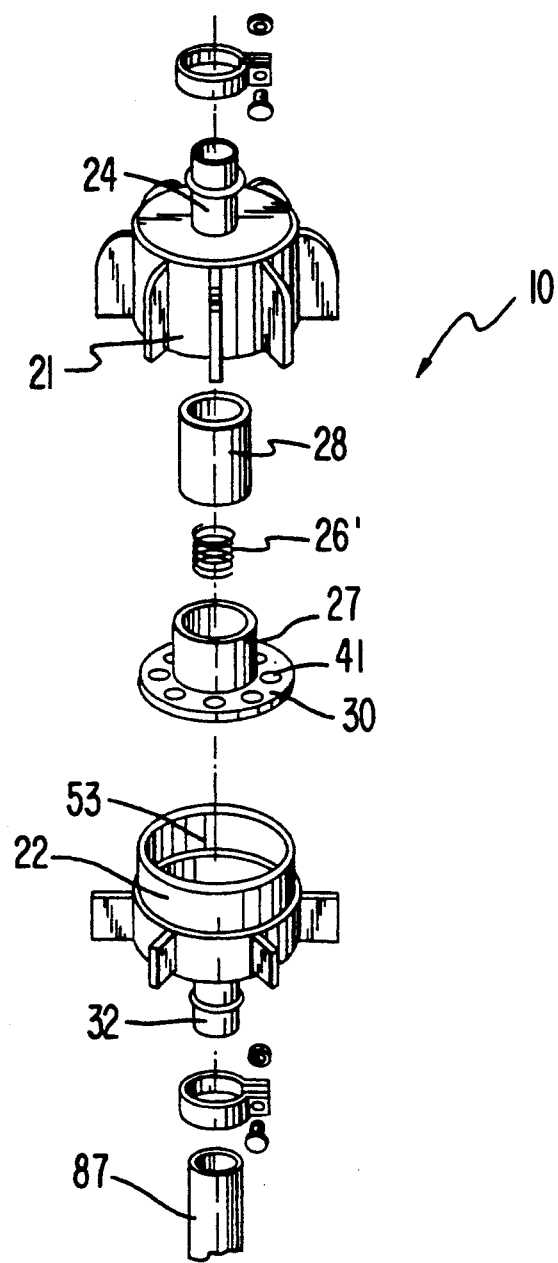
FIG. 11 represents an exploded view of an industrial specification of the air induction control device.

By way of further example, FIG. 11 depicts an industrial schematic of an air induction control valve 10 of the type described in FIG. 1.

Figure 12:
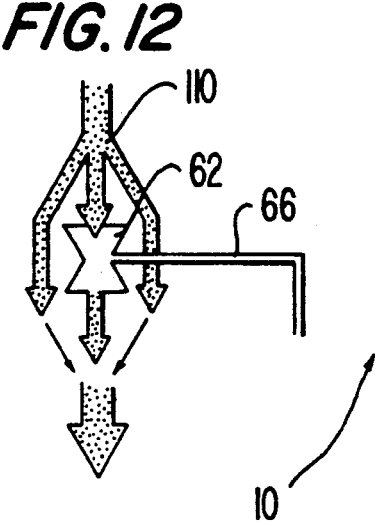
FIG. 12 represents a schematic drawing of the air flow around a carburetor engine where no air induction control device has been installed.
Figure 13:
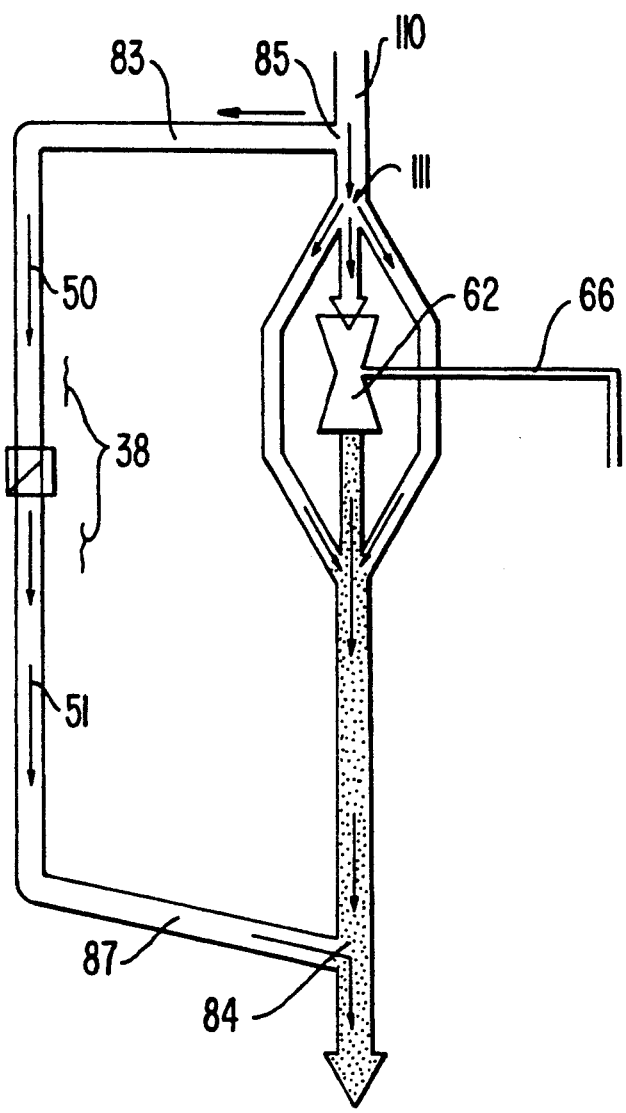
FIG. 13 represents a schematic drawing of the air flow in a carbureted engine with an air induction control device installed.

To better understand the present invention, a comparison of the prior art is shown in FIG. 12 and FIG. 13 respectively. FIG. 12 depicts a schematic drawing of the intake passageway of an internal combustion engine without an air induction control device. Air flow 110 enters the carburetor 62 where it is mixed with fuel from the fuel line 66 on the way to the combustion chamber.

FIG. 13 depicts a schematic drawing of the intake passageway of an internal combustion engine with an air induction control device 10. With the valve closed, air flow enters the carburetor system as in FIG. 12. When the valve member (not shown) opens, air is diverted from the engine intake passageway 111 through the upstream tube 83 of the communication passageway 38 at a point upstream of the carburetor 62 which is at atmospheric pressure 85. The directed air flow 50 then passes through the induction control valve 10. This diverted air flow 50 exits the air induction control device 10 as air flow 51 through the downstream tube where it reenters the downstream passageway.

Other variations can be made without parting from the spirit of the invention and the measurements provided are only exemplary of preferred embodiment of the invention. For example, a wire mesh or screen may replace the calibrated openings of the flow restriction element, which may be made of metal, plastic or resin membrane as long as the appropriate volumetric proportions are maintained. A resin membrane ca be especially effective, provided the mesh of the resin membrane is adequate to control the pressure as well, and provide the necessary calibration. Moreover, the volumetric proportion of the primary chamber: secondary chamber: calibrated openings can be within the ratio 50-70: 25-35: 0.8-1.2, or more preferably of 55-65: 27.5-32.5: 0.9-1.0. The valve member head may be shaped not only as a truncated cone, but also it may be other shapes, such as hemispherical, triangle, pentagonal and the like. The number and shape of the flow restriction openings may be varied. For example, the number of openings may range from a small number to more than eight, and their shapes vary from circular to elliptical, oblong, arcuate or the like. Further, the valve biasing means can be made of any elastomeric material capable of affording a calibrated biasing force.

In addition, the principles of the present invention can easily be modified by one skilled in the art for use in fuel injection engines.

While not wishing to be bound to any theory of operation, applicant believes that the following discussion illustrates the principles behind the exceptional results reached by this device.

All internal combustion engines operate under either the Otto or Carnot cycles with two or four stroke cycles. Combustion in each cylinder occurs due to the presence of fuel and carburant (air-hydrocarbon) in a certain proportion, the most desirable being fourteen (14) parts air to each part hydrocarbon. Normally, that proportion is not maintained precisely, but instead the mixture is uneven depending on the conditions present. Sometimes the mixture is at the correct proportion of air and fuel, but variations in atmospheric pressure and air temperature can cause the number of molecules of air per unit of volume at the intake to vary, and consequently, the air/hydrocarbon bond ratio deviates from the optimal level.

Due to this change in the air/fuel proportion, the fuel mixture in the cylinders changes, becoming "lean" due to an excess of air being present, but "rich" when there is an excess of fuel. Engine efficiency suffers as a result of either condition. Air/fuel mixture is thus dependent on many factors including atmospheric pressure, outside air temperature, the temperature of the air in the intake manifold, value of the vacuum in the intake manifold, combustion temperature, and molecular bonding of fuel to air prior to and during combustion.

The embodiments described above provide a number of significant advantages. The flow restriction element of this invention acts to treat the air through a polarization of oxygen molecules. This is achieved by forcing the air molecules through the set of calibrated openings. The air, by passing through the flow restriction element and being polarized by friction, facilitates optimal molecular bonding between the gasoline and air molecules prior to entry into the combustion chambers. The flow restriction element, in causing the polarization acts to stabilize the number of bondable molecules by controlling the volume of air passing into the intake manifold of the engine in response to variations of engine temperature, intake manifold vacuum, and atmospheric pressure.

As yet another advantage, the action of the valve in responding to pressure changes in the intake manifold adjusts the amount of air and consequently the proportional mix of hydrocarbons and air. When the valve senses such temperature and pressure changes in the secondary chamber, variations in the quantity of air diverted by the air induction control device form the carburetor are induced. When the air flow through the carburetor is lessened, without the attendant intake vacuum caused by throttling, there is a lessening of fuel flow through the carburetor venturi because of the decreased air velocity in the venturi. The result is decreased suction on the fuel.

Temperature variations will also induce pressure variations. When the temperature changes in the combustion chamber, there is also a change in pressure. A "rich" mixture at a lower temperature becomes a "lean" mixture at high temperature. These temperature variations can influence the displacement of the valve, which correspondingly corrects the mixture through admitting more of less polarized air into the combustion chamber.

Upon engine deceleration, an extreme vacuum builds in the intake manifold of the engine, and the air induction control device opens to equalize the pressure. When the engine is progressively accelerated, the vacuum initially becomes smaller, the air induction control device beings to close and the amount of gasoline drawn in by the venturis increases. When the engine revolutions per minute stabilizes for a given speed, the vacuum increases and the air induction control device opens again. At that time, the degree of opening, e.g., displacement of the valve member, will be a function of the pressure differential. Sudden accelerations close the air induction control device entirely and no air is diverted. When that condition ceases, the valve member is displaced proportional to the difference in pressure ensuring optimal proportion of air to fuel as well as an optimal degree of molecular bonding. Depending on the operating conditions of the engine in which this valve is to be installed, the volume of hydrocarbon (gasoline or liquified gas) utilized is reduced considerably. Testing using the air induction control device of the present invention has shown that the utilized hydrocarbon fuel expended is reduced within the following ranges as compared to engines not using the air induction control device of present invention. The maximum fuel saving, was estimated to be about 58.35% at altitudes between sea level and approximately 1,500.00 meters above sea level. As altitude increases, the fuel savings decline to a lower limit of 22.70% at a maximum altitude considered in the design of 5,750.00 meters (19,000.00 feet) above sea level. The result is a considerable saving of fuel, estimated at 40.50% on the average.

The air induction control device also has the advantage of saving gasoline in all driving conditions and in all engine operating ranges. Also, by operating at a controlled lean mixture, the device helps to clear the spark plugs and the combustion chamber, thereby reducing carbon deposits as well as reducing pollution.

Of course, it should be understood, that a wide range of changes and modifications can be made to the preferred embodiments described above. It is therefore intended that the foregoing detailed description be regarded as illustrative rather than limiting and that it be understood that it is the following claims, including all equivalents, which are intended to define the scope of this invention.

I claim:

1. An air induction control device for an internal combustion engine including an intake passageway having a throttle valve, comprising:
   means defining a communication passageway for communicating between air at atmospheric pressure and the air in the downstream passageway from the throttle valve;
   a valve member disposed in said communication passageway and moveable toward the downstream direction thereof to open said communication passageway in response to pressure differential reflecting atmospheric pressure greater than pressure in said downstream passageway;
   valve biasing means disposed to apply force to and bias said valve member in the upstream direction to close said communication passageway, said biasing means responding to the pressure differential between atmospheric pressure and the air pressure in the downstream passageway such that the degree of clearance of sad valve member from a valve seat disposed in said communication passageway upstream from said valve member varies depending on the pressure differential between the air in said downstream passageway air pressure and atmospheric pressure; and
   a flow restriction element positioned downstream of said valve member comprising at least one calibrated opening, said flow restriction element dividing a primary chamber and secondary chamber, wherein the volumetric proportion of the primary chamber: secondary chamber: calibrated opening is about 50-70:25-35: 0.8-1.2.

2. An air induction device in accordance with claim 1, wherein said volumetric proportion is about 55-65: 27.5-32.5: 0.9-1.1.

3. An air induction control device in accordance with claim 1, wherein said volumetric proportion comprises about 60:30:1.

4. An air induction control device in accordance with claim 1, wherein said valve biasing means comprises a spring calibrated to a resistance of about 257.75 g/cm.

5. An air induction control device in accordance with claim 1, wherein said flow restriction element comprises wire screen, wire mesh, or resin membrane.

6. An air induction device in accordance with claim 1 wherein said communication passageway permits communication between the air in the intake manifold and the air at atmospheric pressure.

7. An air induction control device in accordance with claim 1, wherein said air induction control device maximizes fuel efficiency through a polarization of the air molecules within said communication passageway in such a way to optimize the molecular bonding of air and fuel.

8. A method of air induction control in an internal combustion engine including an intake passageway having a throttle valve, comprising:
   providing a communication passageway for communicating between air at atmospheric pressure and air in a downstream passageway from the throttle valve;
   positioning a valve member in said communication passageway which moves toward the downstream direction thereof to open said communication passageway in response to pressure differential reflecting atmospheric pressure greater than pressure in said downstream passageway;
   biasing said valve member to apply force and to bias the valve member in the upstream direction closing said communication passageway, said biasing means responding to the pressure differential between atmospheric pressure and the air pressure in said downstream passageway such that the degree of clearance of said valve member from a valve seat disposed in said communication passageway upstream from said valve member varies depending on the pressure differential between the air in said downstream passageway and atmospheric pressure; and
   providing a flow restriction element positioned downstream of said valve member comprising at least one calibrated opening, said flow restriction element dividing a primary chamber and secondary chamber, wherein the volumetric proportion of the primary chamber: secondary chamber: calibrated opening is about 50-70: 25-35: 0.8-1.2.

9. A method of air induction control in an internal combustion engine in accordance with claim 8, wherein said volumetric proportion is about 55-65: 27.5-32.5: 0.9-1.1.

10. A method of air induction control in an internal combustion engine in accordance with claim 8, wherein said volumetric proportion is about 60:30:1.

11. A method of air induction control in an internal combustion engine in accordance with claim 8, wherein said valve biasing means comprises a spring calibration that includes a resistance of about 257.75 g/cm.

12. A method of air induction control in an internal combustion engine in accordance with claim 8, wherein said flow restriction element comprises wire screen, wire mesh, or resin membrane.

13. A method of air induction control in an internal combustion engine in accordance with claim 8, wherein said communication passageway permits communication between the air in the intake manifold and the air at atmospheric pressure.

14. A method of air induction control in an internal combustion engine in accordance with claim 8, wherein said air induction control device maximizes air and fuel efficiency through polarizing air molecules within said passage in such a way to optimize molecular bonding of air and fuel.

* * * * *